(12) United States Patent
DiSanto

(10) Patent No.: US 9,307,300 B2
(45) Date of Patent: Apr. 5, 2016

(54) LOCATING A PROJECTILE

(71) Applicant: Tracker Force, LLC, Harrisburg, PA (US)

(72) Inventor: Nicolas Alexander DiSanto, Harrisburg, PA (US)

(*) Notice: Subject to any disclaimer, the term of this patent is extended or adjusted under 35 U.S.C. 154(b) by 44 days.

(21) Appl. No.: 14/167,528

(22) Filed: Jan. 29, 2014

(65) Prior Publication Data

US 2014/0266706 A1    Sep. 18, 2014

Related U.S. Application Data

(60) Provisional application No. 61/851,640, filed on Mar. 12, 2013.

(51) Int. Cl.
| | | |
|---|---|---|
| *H04Q 9/00* | (2006.01) | |
| *F42B 6/02* | (2006.01) | |
| *G08C 19/16* | (2006.01) | |
| *F42B 6/04* | (2006.01) | |
| *F42B 12/36* | (2006.01) | |

(52) U.S. Cl.
CPC .. *H04Q 9/00* (2013.01); *F42B 6/02* (2013.01); *G08C 19/16* (2013.01); *F42B 6/04* (2013.01); *F42B 12/362* (2013.01); *H04Q 2209/40* (2013.01); *H04Q 2209/50* (2013.01); *H04Q 2209/823* (2013.01); *H04Q 2209/826* (2013.01)

(58) Field of Classification Search
CPC ............ F42B 6/02; F42B 6/04; F42B 12/362; F42B 12/365; F42B 12/385
USPC ............... 340/539.13, 573.2, 572.8; 473/570, 473/578, 583; 29/428, 453
See application file for complete search history.

(56) References Cited

U.S. PATENT DOCUMENTS

| | | | |
|---|---|---|---|
| 4,704,612 A | 11/1987 | Boy | |
| 4,899,956 A | 2/1990 | King et al. | |
| 4,976,442 A | 12/1990 | Treadway | |
| 5,094,463 A * | 3/1992 | Dryden | F42B 12/385 342/386 |
| 5,157,405 A | 10/1992 | Wycoff | |
| 5,188,373 A | 2/1993 | Ferguson | |
| 6,317,082 B1 * | 11/2001 | Bacon | G01S 13/74 235/385 |
| 6,612,947 B2 * | 9/2003 | Porter | 473/578 |
| 6,856,250 B2 | 2/2005 | Hilliard | |
| 7,300,367 B1 | 11/2007 | Andol | |
| 7,331,887 B1 | 2/2008 | Dunn | |
| 7,493,815 B1 | 2/2009 | Younis | |
| 7,632,199 B2 | 12/2009 | Kikos | |
| 8,192,309 B1 | 6/2012 | Roberts | |
| 8,256,291 B1 | 9/2012 | Younis | |
| 8,323,132 B2 | 12/2012 | Kirsch | |
| 8,529,383 B2 | 9/2013 | Donahoe | |
| 8,809,761 B1 * | 8/2014 | Hunt et al. | 250/214 R |
| 2003/0132846 A1 | 7/2003 | Hilliard | |
| 2007/0105668 A1 | 5/2007 | Kikos | |
| 2008/0287229 A1 * | 11/2008 | Donahoe | F41B 5/14 473/570 |
| 2010/0035709 A1 | 2/2010 | Russell | |
| 2011/0226038 A1 * | 9/2011 | Donahoe et al. | 73/12.05 |

(Continued)

*Primary Examiner* — Steven Lim
*Assistant Examiner* — Hongmin Fan

(57) ABSTRACT

A method and device for transmitting a tracking signal for locating a projectile. A launch condition for a projectile is sensed by a tracking device. The tracking device enters a first transmission mode in which a first signal is transmitted in response to sensing the launch condition. The tracking device transitions to a second transmission mode in which a second signal is transmitted after transmitting the first signal for a defined period of time.

20 Claims, 5 Drawing Sheets

(56) References Cited

U.S. PATENT DOCUMENTS

2011/0250996 A1 10/2011 Jones
2012/0090490 A1* 4/2012 Pattison .................. 102/247
2012/0220399 A1 8/2012 Ferguson
2013/0176110 A1 7/2013 Steinman et al.
2013/0176123 A1* 7/2013 Steinman et al. ........ 340/539.13
2013/0176175 A1* 7/2013 Zusman et al. .............. 342/458

* cited by examiner

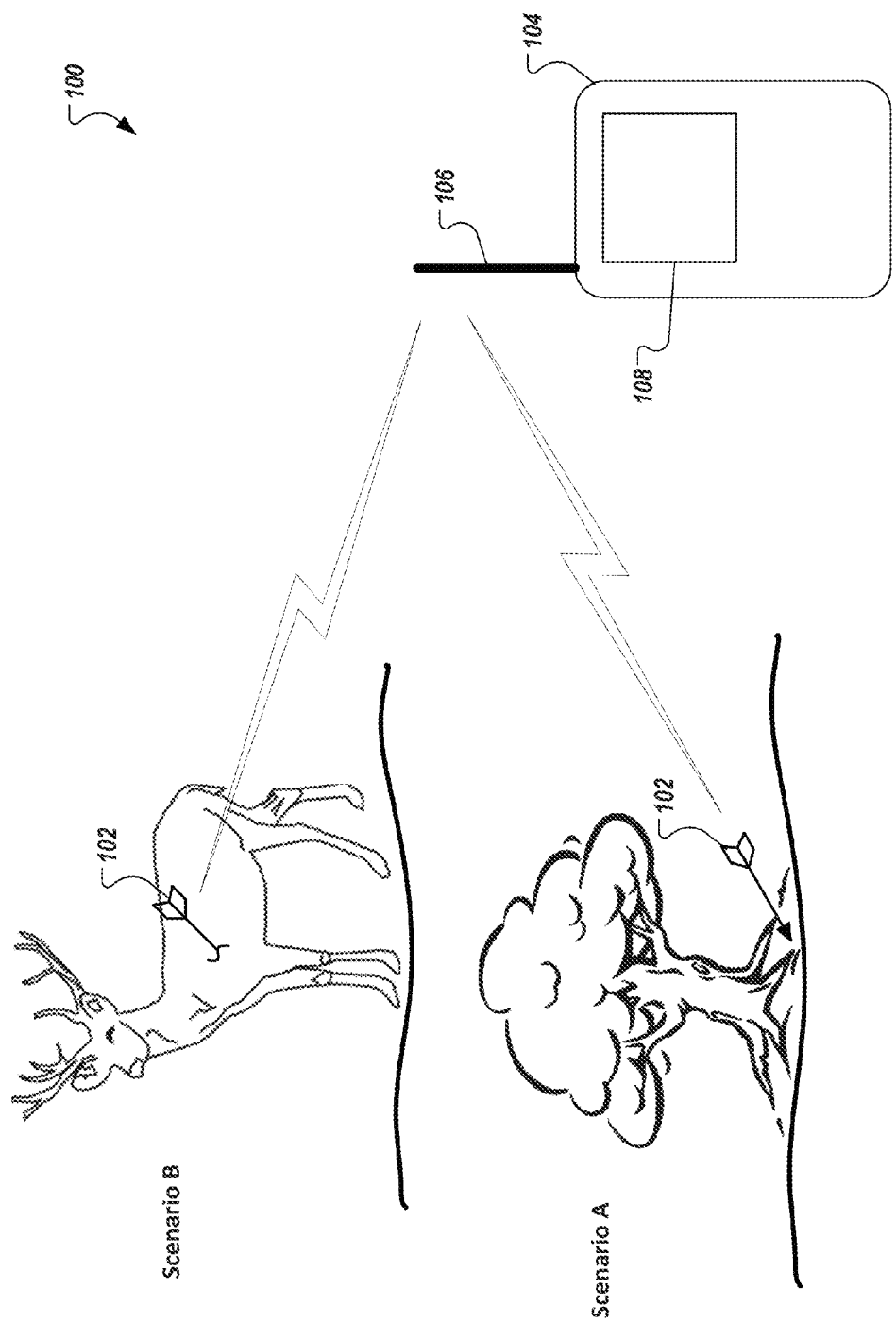

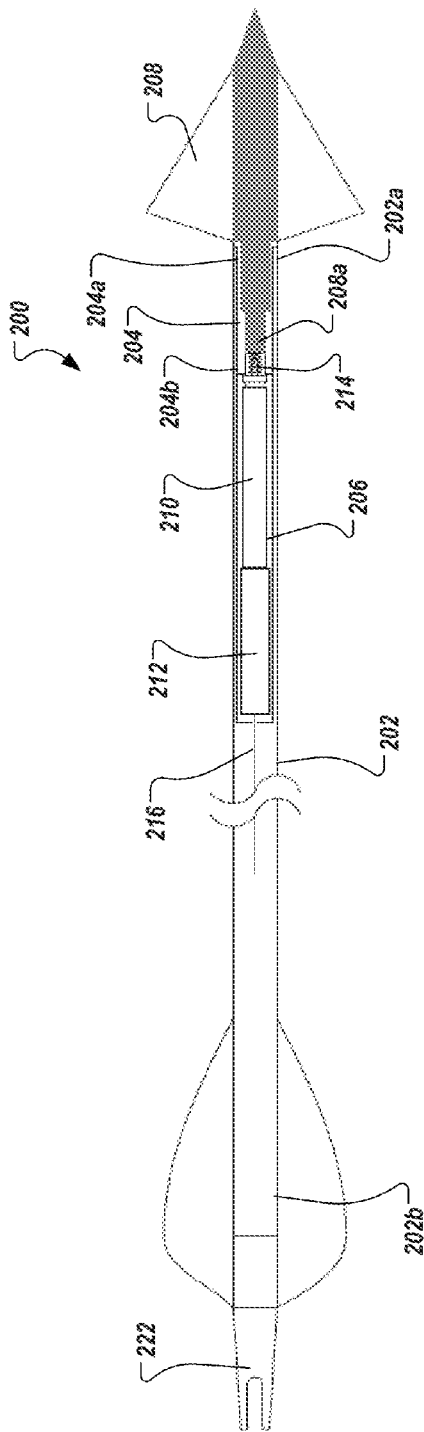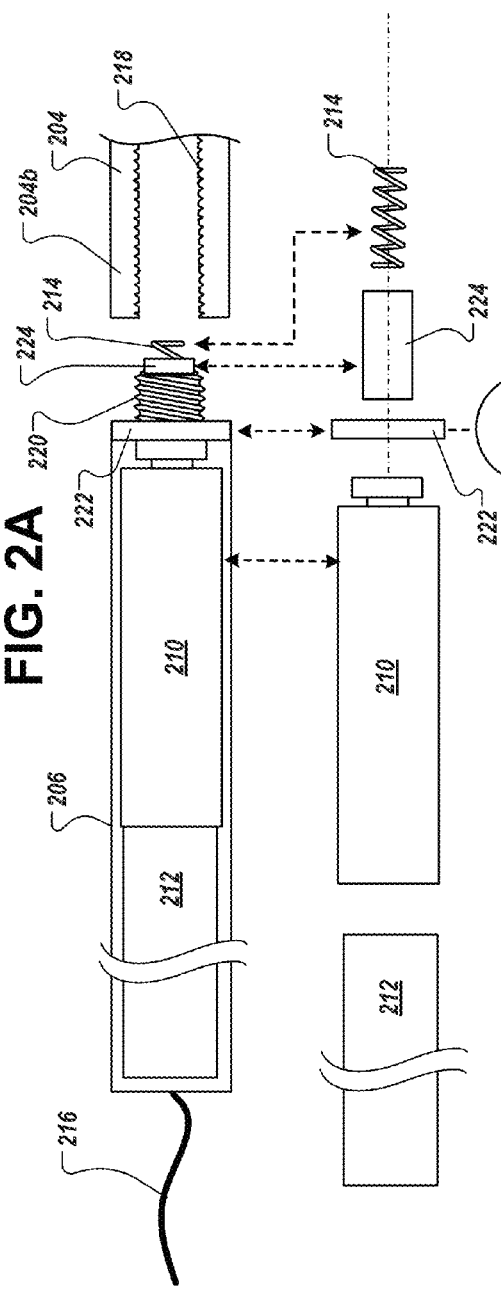
FIG. 2A
FIG. 2B

LOCATING A PROJECTILE

CROSS REFERENCE TO RELATED APPLICATIONS

This application claims the benefit of the filing date of U.S. Provisional Application No. 60/851,640, which was filed on Mar. 12, 2013. The contents of U.S. Application No. 60/851,640 are incorporated by reference in their entirety as part of this application.

FIELD

This document relates to locating a launched projectile.

BACKGROUND

Launched projectiles can be difficult to find and recover. In certain circumstances, one may wish to recover a launched projectile, for example, if the projectile is reusable.

SUMMARY

One aspect features an electronic tracking device that has a protective housing configured to be inserted within a hollow shaft of a projectile. The protective housing contains electronic circuitry which is configured to sense a launch condition for the projectile, enter a first transmission mode in which the electronic circuitry transmits a first signal in response to sensing the launch condition, and transition to a second transmission mode in which the electronic circuitry transmits a second signal, different from the first signal, after transmitting the first signal for a defined period of time.

Implementations can include one or more of the following features. For example, the electronic circuitry includes a controller and an accelerometer in which, to sense the launch condition for the projectile, the controller is configured to receive a measure of an acceleration of the projectile from the accelerometer and determine that the measure of the acceleration exceeds a threshold value. The threshold value may be about 100 Gs.

The electronic circuitry may include a controller, a radio transmitter and an antenna. In order to transmit the first signal, the controller may be configured to control the radio transmitter such that the radio transmitter and antenna transmit a radio frequency pulse at a first repetition rate and in order to transmit the second signal, the controller may be configured to control the radio transmitter such that the radio transmitter and antenna transmit a radio frequency pulse at a second repetition rate, where the second repetition rate is greater than the first repetition rate. The second repetition rate may be sufficient to allow a direction finding receiver to determine a direction of the projectile from the direction finding receiver.

The electronic circuitry may include a controller, an accelerometer, and a radio transmitter, and prior to entering the first transmission mode, the electronic circuitry may be in a standby mode in which the controller and the accelerometer receive power, but the radio transmitter may be in a low power mode.

The electronic circuitry may include a controller, an accelerometer, and a radio transmitter, and when the electronic circuitry is in the first and second transmission modes, the controller and the radio transmitter may receive power, but the accelerometer may be in a low power mode.

The protective housing may be waterproof. The antenna may extend through the protective housing into and along an axis of the hollow shaft of the projectile.

The protective housing may include a threaded nipple configured to screw into a an arrow insert to retain the protective housing in place within the hollow shaft; and a coil spring extending through the hollow threaded nipple, in electrical contact with a terminal of a power source contained within the protective housing, and configured to come into electrical contact with an arrowhead such that the arrowhead completes a power supply circuit for the electronic circuitry including the power source, the coil spring, and the arrowhead.

Another aspect features a method of transmitting a tracking signal for locating a projectile. The method includes sensing a launch condition for the projectile, entering a first transmission mode where a first signal is transmitted in response to sensing the launch condition, and transitioning to a second transmission mode where a second signal is transmitted after transmitting the first signal for a defined period of time.

Another aspect features a trackable projectile that has an elongated hollow shaft having a forward end and a rearward end, an arrowhead attached to the forward end of the elongated hollow shaft, a protective housing disposed within the forward end of the elongated hollow shaft and enclosing an electronic tracking device and a power source electrically connected to the electronic tracking device. The electronic tracking device has a controller, an accelerometer in electrical communication with the controller, a radio transmitter in electrical communication with the controller, and an antenna in electrical communication with the controller and extending through the protective housing and into the elongated hollow shaft. The electronic tracking device and the power source are configured within the elongated hollow shaft such that the arrow head completes an electronic circuit between the electronic tracking device and the power source. The controller includes one or more instructions that when executed causes the controller to perform operations that include entering a standby mode upon application of power, the standby mode providing power to the accelerometer while maintaining the radio transmitter in a low power mode, determining that the projectile has been launched based on an acceleration signal from the accelerometer, transitioning from the standby mode to a first transmission mode wherein the radio transmitter is transitioned out of the low power mode and a first signal is sent to the radio transmitter in response to determining that the projectile has been launched, and transitioning to a second transmission mode wherein a second signal is sent to the radio transmitter after a defined period of time.

The details of one or more implementations are set forth in the accompanying drawings and the description, below. Other features will be apparent from the description and drawings, and from the claims.

BRIEF DESCRIPTION OF THE DRAWINGS

FIG. 1 is a diagram showing an example of an environment in which a projectile with an electronic tracking device may be employed.

FIGS. 2A and 2B are schematic diagrams of an example of a projectile with an electronic tracking device.

Like reference symbols in the various drawings indicate like elements.

DETAILED DESCRIPTION

Figure 3:
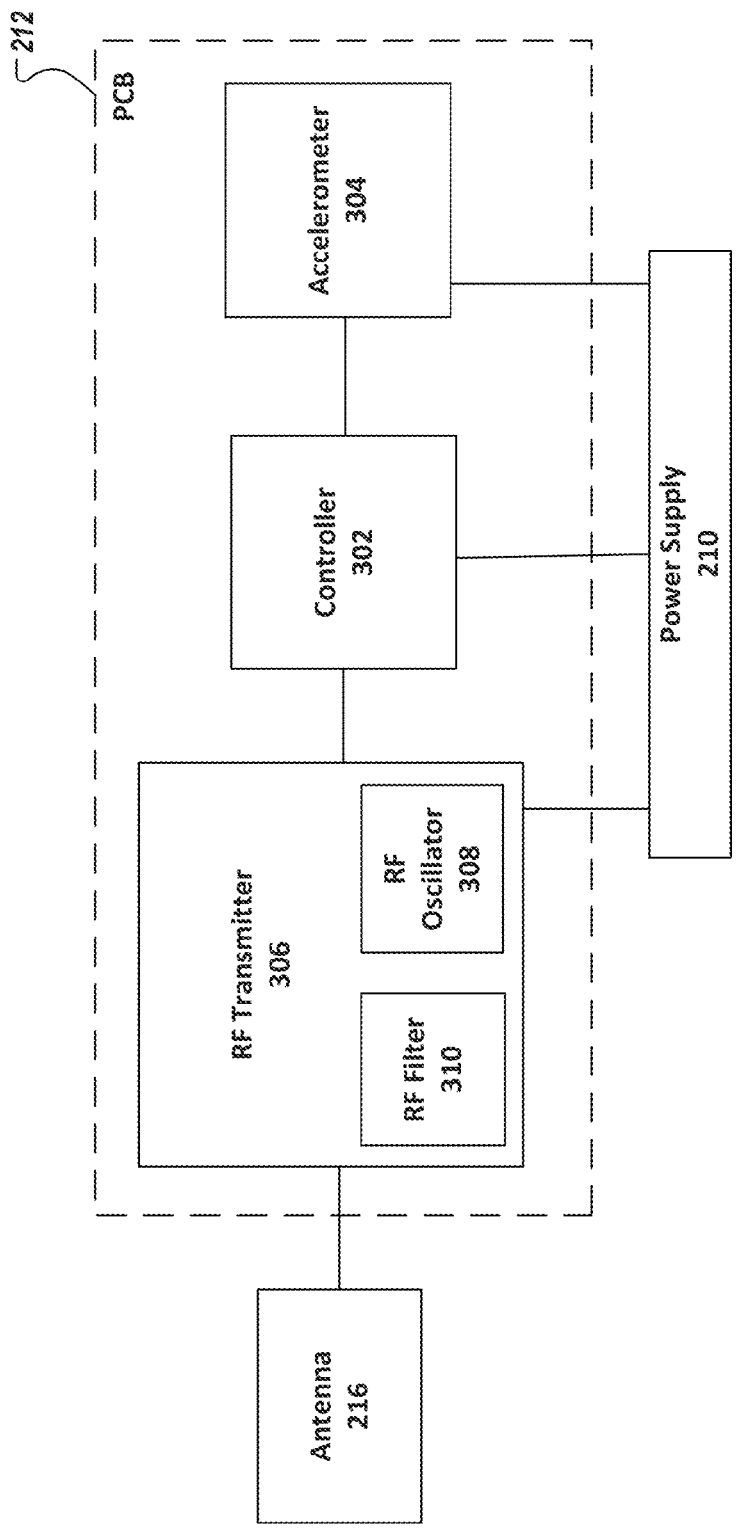
FIG. 3 is a block diagram of an example of the electronic tracking device.

FIG. 1 is a diagram 100 showing an example of an environment in which a projectile 102 with an electronic tracking device may be employed. FIG. 1 illustrates two examples of scenarios in which a projectile 102 with an electronic tracking device may be useful. In the first scenario, one may launch a projectile 102 (e.g., an arrow or crossbow bolt) while hunting or during target practice and the projectile 102 may be lost (scenario A). In the second scenario, the projectile 102 may impale a game animal and the animal, although wounded, may run off and require tracking (scenario B). In either scenario, it may be useful to be able to track the projectile 102 in order to recover the projectile 102, the game animal, or both.

To that end, the projectile 102 is equipped with the electronic tracking device, which transmits a tracking signal that can be received by a tracking receiver 104. The receiver 104 may be a handheld direction finding receiver (e.g., a direction finding radio frequency (RF) receiver (e.g., the Quick Track QTR-MP QTR10MP) or a GPS receiver) that includes an antenna 106 (e.g., a directional antenna) and a user output 108 (e.g., an display screen). The receiver 104 receives the tracking signal using the antenna, processes the received signal to determine a direction to, or location of, the electronic tracking device (and, hence, the projectile 102), and directs a user to the location of the transmitting projectile 102 using the output 108.

FIGS. 2A and 2B are schematic diagrams of an example of a projectile 200 with an electronic tracking device 212. FIG. 2A shows an cut-out view of the projectile 200, while FIG. 2B shows an exploded view of the projectile 200.

The projectile 200 is, for example, an arrow or crossbow bolt and includes a hollow elongated shaft 202 having a fore 202a and an aft end 202b, an insert 204, a tracking device housing 206, and an arrow head 208. The insert 204 is hollow and includes fore 204a and aft openings 204b. The insert 204 is configured to be disposed within the fore end 202a of the shaft 202 and to receive an arrow head 208 in the fore opening 204a and retain the arrow head 208 affixed to the shaft 202 while the projectile 200 is in flight. The insert 204 may be constructed of an electrically conductive material (e.g., a metal).

The tracking device housing 206 is configured to be disposed within the shaft 202 and attached to the aft end 204b of the insert 204. The tracking device housing 206 forms an electrically insulated and waterproof enclosure for a power source 210 (e.g., a battery) and an electronic tracking device 212 (described in more detail in reference to FIG. 3 below). The power source 210 and the electronic tracking device 212 are configured within the tracking device housing 206 such that an open electrical circuit is formed between the power source 210, the electronic tracking device 212, and the tracking device housing 206 when an arrow head 208 is not attached to the insert 204. The electrical circuit is completed and power supplied to the electronic tracking device 212 when an arrow head 208 is inserted into the insert 204, such that current is conducted through the arrow head 208 to complete the circuit.

One terminal of the power source 210 (e.g., a positive terminal) is in electrical contact with a power terminal of the electronic tracking device 212 and an opposite terminal of the power source 210 (e.g., a negative terminal) is in electrical contact with a coil spring 214 (see FIG. 2B) extending from the tracking device housing 206. The tracking device housing 206 also includes a conductive path in electrical contact with the electronic tracking device 212 and with the insert 204 (e.g., a ground path). The coil spring 214 is configured to contact and be compressed by the arrow head 208 when inserted within the insert 204. Thus, an arrow head 208, when inserted into the insert 204 compresses the spring, which provides sufficient force to maintain the terminals of the power supply 210 in firm electrical contact with a power supply contact on the electronic tracking device and with the arrow head 208 during use. The arrow head 208 when fully inserted closes an electrical circuit for powering the electronic tracking device 212. In other words, current to power the electronic tracking device 212 flows, for example, from the power source 210, through the spring 214, through the arrow head 208, through the insert 204, through the conductive path in the tracking device housing 206, and to the electronic tracking device 212.

In addition, the electronic tracking device 212 includes an antenna 216 extending through the tracking device housing 206 and into the hollow portion of the shaft 202. The antenna is electrically connected to the electronic tracking device 212 and configured to transmit radio frequency tracking signals detectable by a radio frequency receiver. In some implementations, the projectile shaft 202 may serve as an antenna and, in such implementations, the electronic tracking device can be electrically connected to the shaft 202 through the tracking device housing 206 via an electrical contact. In some implementations, the arrow head 208 may serve as an antenna and, in such implementations, the electronic tracking device can be electrically connected to the arrow head 208 through the tracking device housing 206 via an electrical contact.

Referring to FIG. 2B, the insert 204 includes threading 218 in the fore 204a and aft 204b opening. The threading 218 is configured to engage corresponding threading 218 on the arrow head 208 for fastening the arrow head 208 to the insert 204. In addition, the tracking device housing 206 includes a nipple 220 at one end. The nipple 220 is configured to be inserted into the aft opening 204b of the insert 204. The coil spring 214 resides inside and protrudes out of the nipple 220 slightly and into the insert 204. As described above, the coil spring 214 serves as a current path between the power source 210 and the arrowhead 208. The spring is in electrical contact with a terminal of the power source 210 (e.g., the negative terminal) and an aft end 208a of the arrowhead 208. In use, the arrowhead 208 compresses the coil spring 214 against the negative terminal of the power source 210. A washer 222 and a buffer 224 electrically insulate the coil spring 214 and the negative terminal of the power source 210 from the inner surface of the housing 206 and the inner surface of the nipple 220. The washer 222 is positioned between one terminal of the power source 210 and the housing 206, and the coil spring 214 passes through the hole in the washer 224 to contact a terminal of the power source 210. The buffer 224 surrounds the coil spring 214 and forms an electrically insulative barrier between the coil spring 214 and the inner surface of the housing 206, nipple 220, and the insert 204. The washer 222 and buffer 224 are composed of an electrically insulative material (e.g., plastic or rubber). The nipple 220 also may include threading 218 corresponding to the threading on the aft end 204b of the insert 204 for fastening the tracking device housing 206 to the insert 204. In some implementations, the nipple 220 and coils spring 214 are configured to extend a minimal distance into the insert 204 (e.g., 1.5-2.0 mm) to ensure that the arrowhead 208 can be properly installed.

In some implementations the nipple 220 may be configured to a length such that it contacts an aft portion 208a of the arrow head 208 when the arrow head 208 is fully inserted in the insert 204. In such an implementation, the power supply circuit for the electronic tracking device may be completed by the arrow head 208 via the coil spring 214 and the tracking device housing 206, and thereby, bypassing the insert 204.

In some implementations, however, the tracking device housing 206 and the insert 204 may be formed as a single integral component. In some implementations, the tracking device housing 206 may include a removable outer sleeve; to enable the tracking device housing 206 to be adapted for use in projectiles 200 having shafts 202 of various different internal diameters, for example.

In some implementations, the position of the power source 210 and the electronic tracking device 212, as depicted in FIGS. 2A and 2B, may be exchanged.

Locating the tracking device housing 206 (and hence, the tracking device 212) in the fore end 202a of the shaft 202, as depicted in FIGS. 2A and 2B, may be advantageous in some situations. For example, an arrow launched at a game animal may strike bone and break leaving only the forward portion of the shaft 202 and arrow head 208 in the game animal. Having the tracking device 212 in the fore end 202a may increase the chances that the tracking device 212 stays with the game animal in this case, which would result in the ability to track the game animal.

However, while locating the tracking device 206 (and hence, tracking device 212) in the fore end 202a may be advantageous in some cases, the tracking device housing 206 may be configured to be inserted in the aft end 202b of the shaft 202. In such implementations, an electrically conductive nock 222 may serve to complete the power circuit between the power source 210 and the electronic tracking device 212 in a similar manner as describe with respect to the arrow head 208.

FIG. 3 is a block diagram of an example of the electronic tracking device 212. The electronic tracking device 212 includes a controller 302, an accelerometer 304, and an RF transmitter 306. The antenna 216 is coupled to the RF transmitter 306, and the power supply 210 supplies electrical power to the controller 302, the accelerometer 304, and the RF transmitter 306.

The electronic tracking device 212 is, for example, produced on a printed circuit board (PCB) using surface mount devices (e.g., the controller 302, the accelerometer 304, the RF transmitter 306, and associated circuit components, such as, capacitors, inductors, resistors, and transistors are surface mount devices). The electronic tracking device 212 may alternatively be produced on a PCB using through-hole components, or a combination of surface mount and through-hole components, or may be produced as an integrated circuit.

The controller 302 may be implemented using a low power microcontroller. For example, the controller may be implemented using a PIC12F1840 microcontroller from Microchip Technology, Inc, which may operate at 1.8V-3.3V with a standby current of 20 nA @ 1.8V, typical, and an active current of 50 uA/MHz @ 1.8V, typical. The controller 302 may alternatively, or additionally, be implemented using a computer processor, a field programmable gate array (FPGA), or an application specific integrated circuit (ASIC). In some cases, the controller 302 is in-circuit programmable. The controller 302 is in electrical communication with the accelerometer 304 and the RF transmitter 306.

The accelerometer 304 may be implemented using a low power accelerometer capable of sensing acceleration along at least one axis. The accelerometer 304 communicates acceleration information to the controller 302 and may be capable of being transitioned to and from a low-power mode (e.g., placed in a standby mode or powered off) by the controller 302. In some implementations, the accelerometer is capable of sensing at least 100 Gs of acceleration along one or more axes. As an example, the accelerometer may be implemented using a H3LIS331 DL accelerometer from STMicroelectronics, which is a microelectromechanical system (MEMS) based sensor capable of sensing at least 100 Gs of acceleration along three axis, and operable at 2.16V-3.6V with current consumption in normal mode of 300 uA @ 2.5V, typical, current consumption in low power mode of 10 uA @ 2.5, typical, and current consumption in power-down mode of 1 uA @ 2.5V, typical.

The RF transmitter includes an RF oscillator 308 and an RF filter 310. The RF oscillator 308 is in electrical communication with the controller 302 and generates RF signals that are passed through the RF filter 310 and transmitted by the antenna 216. The RF oscillator 308 may be capable of transmitting various types of signals on various different carrier frequencies (see e.g., FIG. 5 and the associated description below) as controlled by the controller 302. In some implementations, the RF oscillator 308 is capable of being transitioned to and from a low-power mode (e.g., placed in a standby mode or powered off) by the controller 302.

In some implementations, the electronic tracking device 212 may include a magnetic sensor in electrical communication with the controller 302. The magnetic sensor may be included in addition to the accelerometer 304 or as a replacement for the accelerometer 304.

During operation, the electronic tracking device 212 starts out in a low power mode in which the RF transmitter 306 is placed in a low power mode (e.g., a standby mode or powered off), while the accelerometer 304 (and/or the magnetic sensor, depending on the implementation) is in a normal mode. The controller uses the accelerometer 304 (and/or the magnetic sensor) to detect a launch condition of the projectile 200 (for example, when an arrow is fired from a bow). Once the launch condition is detected, the controller 302 turns on the RF transmitter 306 or transitions the RF transmitter 306 into a normal mode, while transitioning the accelerometer 304 (and/or magnetic sensor) into a low power mode (e.g., a standby mode or powered off), and controls the RF transmitter 306 to transmit tracking signals. Initially, in a first transmission mode, the controller 302 controls the RF transmitter 306 to transmit a first signal that is configured to verify operation of the electronic tracking device 212 when received by the receiver 104 but to use less power than a second signal sent during a second transmission mode. After a defined period of time, the controller 302 transitions into a second transmission mode and controls the RF transmitter 306 to transmit a second signal that is configured for better direction finding (relative to the first signal) when received by the receiver 104. Lastly, the controller 302 remains in the second transmission mode until the power supply 210 is exhausted or power is disconnected by, for example, removing the arrow head 208.

Figure 4:
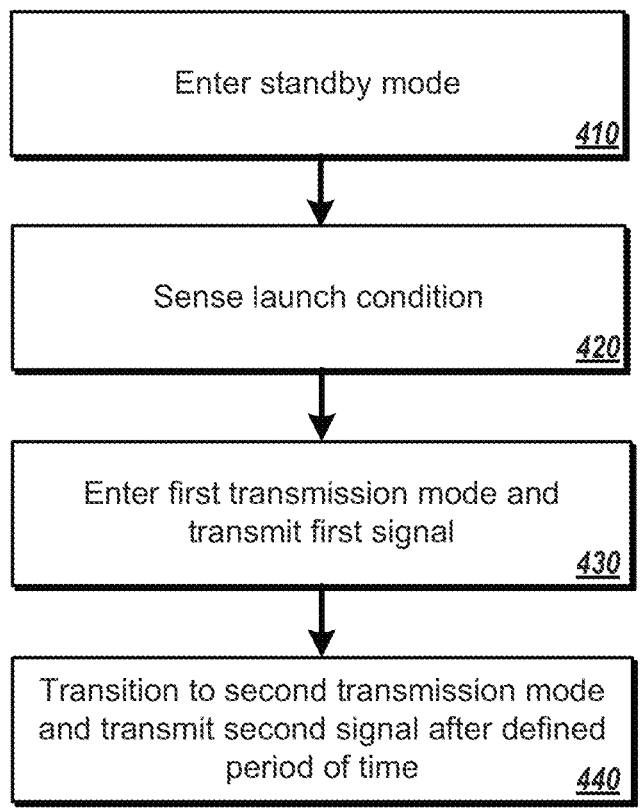
FIG. 4 illustrates an example of a process of operation for the electronic tracking device.

FIG. 4 illustrates an example of a process of operation 400 of the electronic tracking device 212. Briefly, the process 400 includes: entering a standby mode (410), sensing a launch condition (420), entering a first transmission mode transmitting a first signal (430), and transitioning to a second transmission mode transmitting a second signal after a defined period of time (440).

In more detail when process 400 begins, power is applied to the electronic tracking device 212 and the controller 302 places the electronic tracking device 212 in a standby mode (410). During the standby mode the controller 302 performs minimal processing tasks while monitoring for a launch condition. In addition, the controller places the RF transmitter 306 in a low power mode (e.g., a standby mode or powered off).

Next, the controller senses a launch condition for the projectile 200 (420). The accelerometer 304 senses the acceleration that the projectile 200 experiences during launch and sends an acceleration signal to the controller 302. The controller 302 evaluates the received signal and determines whether the sensed acceleration is sufficient to indicate that the projectile 200 was launched. For example, the controller may compare the acceleration signal to a threshold acceleration value. An acceleration value above a threshold acceleration value of, for example, about 100 Gs (e.g., 100±10%) may indicate that the projectile 200 has been launched. The threshold acceleration value may be set to indicate the acceleration of the projectile 200 while being launched, the acceleration a projectile 200 may experience upon impact with a target, or both.

In some implementations, the accelerometer 304 determines whether a measured acceleration signal is sufficient to indicate that the projectile 200 was launched, for example, by comparing the measured signal to a threshold value. In such an implementation, an output of the accelerometer 304 may trigger an interrupt on the controller 302 to indicate to the controller 302 that the projectile 200 has been launched.

In some implementations, the launch condition may be established by sensing an acceleration signal along only one axis that meets or exceeds the threshold acceleration value. In some implementations, the launch condition may require a sensed acceleration signal along more than one axis to meet or exceed the threshold acceleration value. In such implementations, a different threshold acceleration value may be set for each of the more than one axes (e.g., a threshold acceleration value along the axis of the projectile shaft 202 of 100 Gs and a threshold acceleration value along one or more axes perpendicular to the axis of the shaft of 80 Gs).

In an implementation of the electronic tracking device 212 that employs a magnetic sensor, the launch condition may be a magnetic signal. For example, a launching apparatus (e.g., a bow or crossbow) may have a magnet attached to a point which the projectile 200 will pass by when launched. Receipt of a defined magnetic signature indicating that the projectile 200 has passed by the magnet may serve as a launch condition. In implementations of the electronic tracking device that employ both an accelerometer 304 and a magnetic sensor, the controller may evaluate both an acceleration signal and a magnetic signal to determine whether a launch condition has been met and the projectile 200 has been launched.

In response to sensing the launch condition, the controller 302 enters a first transmission mode and transmits a first signal (e.g., signal 500 of FIG. 5) (430). Once a launch condition has been sensed, the electronic tracking device 212 begins transmitting a first low power signal. The controller 302 regulates the RF transmitter 306 to generate and transmit the first signal. Within the RF transmitter 306, the RF oscillator 308 generates the first signal and passes the first signal through the RF filter 310 to the antenna 216. The first signal may be an RF pulse signal receivable by a direction finding RF receiver. In addition, the controller 302 may, in some implementations, transition the acceleration sensor (e.g., accelerometer) to a low power mode (e.g., a standby mode or powered off) during the first transmission mode, thereby saving power and extending the life of the power source 210.

Finally, the controller 302 transitions to a second transmission mode and transmits a second signal after a defined period of time in the first transmission mode (e.g., signal 505 of FIG. 5) (440). The controller 302 regulates the RF transmitter 306 to generate and transmit the second RF signal after the defined period of time expires. As in the first transmission mode, within the RF transmitter 306, the RF oscillator 308 generates the first signal passes the first signal through the RF filter 310 to the antenna 216. Similar to the first signal, the second signal may be an RF pulse signal receivable by a direction finding RF receiver.

The first signal generally consumes less power than the second signal by, for example, using a lower pulse repetition rate than the second signal. In addition, the first signal may indicate proper operation of the electronic tracking device 212. By contrast, the higher pulse repetition rate of the second signal may provide a better direction finding input for a direction finding RF receiver. In some implementations, the electronic tracking device 212 may not transmit the first signal after sensing a launch indication, and instead transmit only the second signal. In addition, the controller 302 may, in some implementations, maintain the acceleration sensor (e.g., accelerometer) in a low power mode (e.g., a standby mode or powered off) during the second transmission mode, thereby saving power and extending the life of the power source.

The defined time period may be, for example, 1 hour, 30 min, 15 min, or other appropriate value as determined based on a specific application. There may be times where one would begin tracking game immediately, for instance, when deciding whether to place another projectile on target, when bad weather were expected, or when one were afraid of losing the game's trail. In some implementations, a user may be allowed to adjust the defined time period.

The electronic tracking device 212 remains in the second transmission mode and continues transmitting the second signal until the power is removed, for example, either when the power source 210 is exhausted or the arrow head 208 is removed. The electronic tracking device 212 is then reset and will return to standby mode (410) once power is reapplied.

Figure 5:
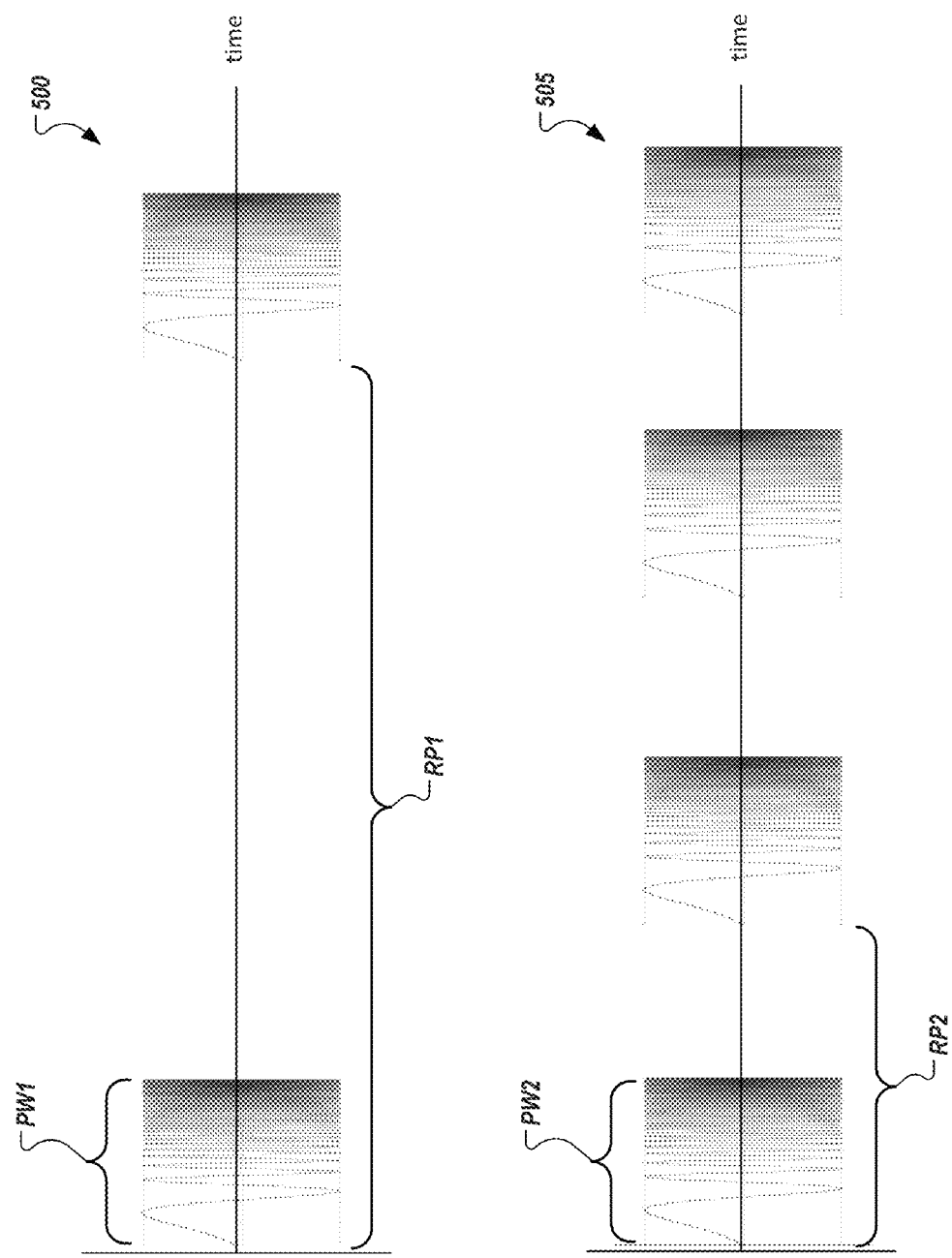
FIG. 5 shows examples of tracking signals generated by the electronic tracking device.

FIG. 5 shows examples of tracking signals (500 and 505) generated by the electronic tracking device 212. Signal 500 is an example of the first signal and signal 505 is an example of the second signal. The signals 500 and 505 are represented as chirp signals with a signal pulse width (PW1 and PW2) and a signal repetition period (RP1 and RP2); the signal repetition rate being the reciprocal of the repetition period. For example, PW1 and PW2 may be 25 milliseconds and RP1 and RP2 may be 1 min and 1 second respectively, however, various pulse widths and repletion periods may be used for either the first and the second tracking signals (500 and 505). Although illustrated as having similar pulse widths, PW1 and PW2 may be different values. Up-chirp signals are illustrated in FIG. 5, however, the signals (500 and 505) may use other appropriate pulse types. Since signal 500 uses a longer repetition period (and therefore lower repetition rate) than signal 505, the transmission of signal 500 uses less power than the transmission of signal 505. However, signal 505 may provide better (for example, quicker or more accurate) direction finding by a direction finding receiver than signal 500.

In some implementations one or both of the signals (500 and 505) may encode a unique signature to identify each of the multiple projectiles 200 configured with an electronic tracking device. In such an implementation a receiver may be configured to read the unique signature and provide a user with an indication of both the location and the identity of each projectile 200. For example, several electronic tracking devices 212 installed in different projectiles 200 may transmit first and/or second tracking signals (500 and/or 505) having different pulse widths and/or different signal repetition periods so as to allow a user to distinguish signals of each projectile 200 from among the several projectiles 200. In other implementations, the several arrows may be, for example, identified by a serial number (e.g., 01, 02, 03, etc.) encoded within the first and/or second signal and the receiver may be configured to display an indication of the identity of each transmitting projectile 200 and/or filter signals from another user's projectiles 200.

In some implementations, a user may be allowed to adjust the characteristics (pulse width and/or pulse repetition period) of the tracking signals (500 and 505).

In some implementations, the electronic tracking device 212, may alternatively, or in addition, include a GPS transceiver. In such implementations, the electronic tracking device 212 may include an additional antenna and a GPS receiver. The GPS receiver may be configured to receive satellite GPS signals to determine the position of the electronic tracking device. The controller 302 may then pass the data encoding the GPS coordinates of the electronic tracking device 212 to the RF transmitter 306 for transmission to an RF receiver.

In such implementations, first and second signals may include GPS coordinates determined by the GPS transceiver. In this situation, the first and second signals may or may not also be configured for direction finding by a direction finding receiver. If the signals are not configured for direction finding, then the receiver may simply determine the location of the tracking device on a map using the received GPS coordinates, and display the map with the location on a display. If the signals are configured for direction finding, the receiver may use the direction finding for error correction of the GPS, or may display the direction in addition to or as an alternative to the map with the location.

In either event, the first signal may still use a longer repetition rate than the second signal so as to reduce power consumption during transmission of the first signal. In some implementations, the electronic tracking device 212 may enable the GPS receiver upon sensing a launch condition instead of transmitting the first signal. The electronic tracking device may then continue to receive the GPS signals for the defined period of time and/or until the position of the electronic tracking device 212 is stationary for a defined period of time. After which, the electronic tracking device 212 may then begin transmitting the second signal including the GPS coordinates of the electronic tracking device 212, and hence, the location of the projectile 200. Thus, the electronic tracking device 212 may remain in a passive (receiving) state until the position of the projectile 200 is relatively stationary (e.g., indicating that a game animal impaled by the projectile may have expired), and thereby saving power.

In one variation of this implementation, the RF transmitter 306 may be a transceiver capable of receiving an acknowledgement signal from the RF receiver confirming that the receiver has accurately received the projectile's 200 position. In such an implementation, power may be conserved, by transmitting the GPS coordinates to a receiver only when the position of the electronic tracking device 212 changes by a defined distance.

Certain implementations described above may provide various advantages. For example, some implementations may allow a sportsman to find and recover reusable and potentially expensive projectiles. Additionally, for example, some implementations may allow a wounded game animal to be tracked even if a hunting projectile breaks after impaling the animal. In addition, for example, some implementations may provide extended tracking time by conserving the power available from the power source.

Other implementations are also contemplated. As such, the electronic tracking device described above may be used in alternate applications in addition to use in a projectile, as described above. For example, the tracking device housing may be attached to an appropriately configured dog collar and may be fitted with a power switch. In such an implementation, the launch condition may be actuated by vigorously shaking the tracking device housing and/or the acceleration threshold value may be user adjustable (e.g., with an external dial or switch). Thus, a hunter may be able to use the electronic tracking device to locate a hunting dog while bird hunting, for example. For an avid outdoorsman one electronic tracking device may thereby serve multiple purposes, for example, both as a tracking device for an arrow and for a hunting dog.

The techniques described herein can be implemented in digital electronic circuitry, or in computer hardware, firmware, software, or in combinations of them. A computer program can be written in any form of programming language, including compiled or interpreted languages, and it can be deployed in any form, including as a stand-alone program or as a module, component, subroutine, or other unit suitable for use in a computing environment.

While a number of examples have been described for illustration purposes, the foregoing description is not intended to limit the scope of the invention, which is defined by the scope of the appended claims. There are and will be other examples and modifications within the scope of the following claims.

The invention claimed is:

1. An electronic tracking device comprising:
   a protective housing configured to be inserted within a hollow shaft of a projectile, the protective housing comprising:
   a threaded nipple configured to screw into a an arrow insert to retain the protective housing in place within the hollow shaft;
   a coil spring extending through the hollow threaded nipple, in electrical contact with a terminal of a power source contained within the protective housing, and configured to come into electrical contact with an arrowhead; and
   electronic circuitry configured to:
   sense a launch condition for the projectile;
   in response to sensing the launch condition, enter a first transmission mode in which the electronic circuitry transmits a first signal; and
   transition, after transmitting the first signal for a defined period of time, to a second transmission mode in which the electronic circuitry transmits a second signal, wherein the second signal is different from the first signal, and
   wherein the arrowhead, when attached to the hollow shaft, completes a power supply circuit for the electronic circuitry including the power source, the coil spring, and the arrowhead.

2. The electronic tracking device of claim 1, wherein:
   the electronic circuitry includes a controller and an accelerometer; and
   to sense the launch condition for the projectile, the controller is configured to receive a measure of an acceleration of the projectile from the accelerometer and determine that the measure of the acceleration exceeds a threshold value.

3. The electronic tracking device of claim 2, wherein the threshold value is about 100 Gs.

4. The electronic tracking device of claim 1, wherein
   the electronic circuitry includes a controller, a radio transmitter and an antenna;
   to transmit the first signal, the controller is configured to control the radio transmitter such that the radio transmitter and antenna transmit a radio frequency pulse at a first repetition rate; and
   to transmit the second signal, the controller is configured to control the radio transmitter such that the radio transmitter and antenna transmit a radio frequency pulse at a second repetition rate, wherein the second repetition rate is greater than the first repetition rate.

5. The electronic tracking device of claim 4, wherein the second repetition rate is sufficient to allow a direction finding receiver to determine a direction of the projectile from the direction finding receiver.

6. The electronic tracking device of claim 1, wherein
the electronic circuitry includes a controller, an accelerometer, and a radio transmitter; and
prior to entering the first transmission mode, the electronic circuitry is in a standby mode in which the controller and the accelerometer receive power, but the radio transmitter is in a low power mode.

7. The electronic tracking device of claim 1, wherein the electronic circuitry includes a controller, an accelerometer, and a radio transmitter, and
wherein when the electronic circuitry is in the first and second transmission modes, the controller and the radio transmitter receive power, but the accelerometer is in a low power mode.

8. The electronic tracking device of claim 1, wherein the protective housing is waterproof.

9. The electronic tracking device of claim 4, wherein the antenna extends through the protective housing into and along an axis of the hollow shaft of the projectile.

10. A method executed by electronic circuitry for transmitting a tracking signal for locating a projectile, the method comprising:
sensing a launch condition for the projectile;
in response to sensing the launch condition, entering a first transmission mode wherein a first signal is transmitted; and
transitioning, after transmitting the first signal for a defined period of time, to a second transmission mode wherein a second signal is transmitted,
wherein the electronic circuitry is contained in a protective housing comprising:
a threaded nipple configured to screw into a an arrow insert to retain the protective housing in place within a hollow shaft of the projectile; and
a coil spring extending through the hollow threaded nipple, wherein the coil spring is in electrical contact with a terminal of a power source, and configured to come into electrical contact with an arrowhead such that the arrowhead, when attached to the hollow shaft, completes a power supply circuit for the electronic circuitry including the power source, the coil spring, and the arrowhead.

11. The method of claim 10, wherein sensing a launch indication comprises:
determining, based on comparing an acceleration signal from an accelerometer to a threshold value, that the projectile has been launched.

12. The method of claim 11, wherein the threshold value is about 100 Gs.

13. The method of claim 10, wherein:
the first signal is a radio frequency pulse transmitted at a first repetition rate; and
the second signal is a radio frequency pulse transmitted at a second repetition rate, the second repetition rate being higher than the first repetition rate.

14. The method of claim 10, wherein in response to sensing the launch condition, entering a first transmission mode wherein a first signal is transmitted comprises in response to sensing the launch condition, entering a first transmission mode wherein a first signal is transmitted and an accelerometer placed in a low power mode.

15. A trackable projectile comprising:
an elongated hollow shaft having a forward end and a rearward end;
an arrowhead attached to the forward end of the elongated hollow shaft;
a protective housing disposed within the forward end of the elongated hollow shaft and enclosing an electronic tracking device and a power source electrically connected to the electronic tracking device, the electronic tracking device comprising:
a controller;
an accelerometer in electrical communication with the controller;
a radio transmitter in electrical communication with the controller; and
an antenna in electrical communication with the controller and extending through the protective housing and into the elongated hollow shaft, and
wherein the electronic tracking device and the power source are configured within the elongated hollow shaft such that the arrow head completes an electronic circuit between the electronic tracking device and the power source, and
wherein the controller includes one or more instructions that when executed causes the controller to perform operations that include:
entering a standby mode upon application of power, the standby mode providing power to the accelerometer while maintaining the radio transmitter in a low power mode;
determining, based on an acceleration signal from the accelerometer, that the projectile has been launched;
in response to determining that the projectile has been launched, transitioning from the standby mode to a first transmission mode wherein the radio transmitter is transitioned out of the low power mode and a first signal is sent to the radio transmitter; and
transitioning, after a defined period of time, to a second transmission mode wherein a second signal is sent to the radio transmitter, and
wherein the protective housing comprises:
a threaded nipple configured to screw into a an arrow insert to retain the protective housing in place within the hollow shaft; and
a coil spring extending through the hollow threaded nipple, wherein the coil spring is in electrical contact with a terminal of the power source, and configured to come into electrical contact with the arrowhead such that the arrowhead, when attached to the hollow shaft, completes a power supply circuit for the electronic circuitry including the power source, the coil spring, and the arrowhead.

16. The trackable projectile of claim 15, wherein the protective housing is waterproof.

17. The trackable projectile of claim 15, wherein determining, based on an acceleration signal from the accelerometer, that the projectile has been launched comprises determining, based on comparing an acceleration signal from the accelerometer to a threshold value, that the projectile has been launched.

18. The trackable projectile of claim 17, wherein the threshold value is about 100 Gs.

19. The trackable projectile of claim 15, wherein in response to determining that the projectile has been launched, transitioning from the standby mode to a first transmission mode wherein the radio transmitter is transitioned out of the low power mode and a first signal is sent to the radio transmitter comprises in response to determining that the projectile has been launched, transitioning from the standby mode to a first transmission mode wherein the radio transmitter is transitioned out of the low power mode, a first signal is sent to the radio transmitter, and the accelerometer is transitioned into a low power mode.

20. The trackable projectile of claim 15, wherein the first signal is a radio frequency pulse at a first repetition rate,
wherein the second signal is a radio frequency pulse at a second repetition rate, and
wherein the second repetition rate is greater than the first repetition rate and the second repetition rate is sufficient to allow a direction finding receiver to determine a direction of the projectile from the direction finding receiver.

\* \* \* \* \*